United States Patent
Park et al.

(10) Patent No.: US 7,375,868 B2
(45) Date of Patent: May 20, 2008

(54) IMAGE SCANNING APPARATUS

(75) Inventors: Mun-Kue Park, Suwon-si (KR); Jung-Kee Lee, Hwaseong-si (KR); Sung-Soo Park, Suwon-si (KR); Byeong-Hoon Park, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/543,666

(22) Filed: Oct. 5, 2006

(65) Prior Publication Data

US 2007/0081214 A1  Apr. 12, 2007

(30) Foreign Application Priority Data

Oct. 10, 2005   (KR) ...................... 10-2005-0095072

(51) Int. Cl.
*G02B 26/08* (2006.01)
*G02B 5/18* (2006.01)

(52) U.S. Cl. ........................ 359/204; 359/566
(58) Field of Classification Search ................ 359/204
See application file for complete search history.

(56) References Cited

U.S. PATENT DOCUMENTS

| | | | | |
|---|---|---|---|---|
| 4,754,272 A | * | 6/1988 | Illenberg et al. | 340/815.67 |
| 5,459,610 A | | 10/1995 | Bloom et al. | 359/572 |
| 6,088,102 A | | 7/2000 | Manhart | 356/354 |
| 6,229,650 B1 | * | 5/2001 | Reznichenko et al. | 359/566 |
| 6,476,848 B2 | | 11/2002 | Kowarz et al. | 347/255 |
| 6,724,515 B1 | | 4/2004 | Kowarz | 359/290 |
| 7,104,652 B2 | * | 9/2006 | Kojima | 353/33 |
| 7,239,449 B2 | * | 7/2007 | Leitel et al. | 359/618 |
| 2004/0109242 A1 | * | 6/2004 | Komma et al. | 359/738 |
| 2004/0228014 A1 | * | 11/2004 | Kelly | 359/831 |
| 2006/0039053 A1 | * | 2/2006 | Yang et al. | 359/204 |
| 2006/0209374 A1 | * | 9/2006 | Willemsen | 359/205 |

* cited by examiner

*Primary Examiner*—Stephone B. Allen
*Assistant Examiner*—Jade Callaway
(74) *Attorney, Agent, or Firm*—Cha & Reiter, LLC

(57) ABSTRACT

An image scanning apparatus for realizing an image on a screen includes: a spatial light modulator module for diffracting light beams having different wavelengths into relevant modes; and an iris for limiting light beams of modes except a mode of $0^{th}$-order among the modes diffracted by the spatial light modulator module.

10 Claims, 8 Drawing Sheets

IMAGE SCANNING APPARATUS

CLAIM OF PRIORITY

This application claims priority under 35 U.S.C. § 119 to an application entitled "Image Scanning Apparatus," filed in the Korean Intellectual Property Office on Oct. 10, 2005 and assigned Ser. No. 2005-95072, the contents of which are incorporated herein by reference.

BACKGROUND OF THE INVENTION

1. Field of the Invention

The present invention relates generally to an image scanning apparatus, and in particular, to a portable image scanning apparatus including a spatial modulator module.

2. Description of the Related Art

Recently, image scanning apparatuses using a laser light source, such as a semiconductor laser, have been suggested. Such an image scanning apparatus having a laser light source can be used in projectors, projector televisions, color scanners, and color printers. When the image scanning apparatus including a laser light source is used in projectors and projector televisions, the image scanning apparatus obtains an image on a screen. When the image scanning apparatus including a laser light source is used in color scanners and color printers, the image scanning apparatus reproduces an image on a drum.

The image scanning apparatus includes laser light sources, such as a semiconductor laser, for generating light beams having different visible wavelengths and a spatial light modulator for irradiating the light beams on each pixel according to the necessity. Various types of spatial light modulators are used for image scanning apparatuses.

For the spatial light modulators, diffraction gratings capable of modulating the characteristic of incident light are generally used. Examples of the diffraction gratings are: a planar grating light-valve (GLV) as a spatial light modulator described by David M. Bloom et al. in U.S. Pat. No. 5,459,610 issued Oct. 17, 1995; a grating electromechanical system (GEMS) described by Kowarz et al in U.S. Pat. No. 6,476,848 issued Jun. 25, 2002; an image scanning apparatus using a GLV is described by Paul K. Manhart et al. in U.S. Pat. No. 6,088,102 issued Jul. 11, 2000; and an image scanning apparatus using a GEMS is described by Kowarz et al. in U.S. Pat. No. 6,724,515 issued Apr. 20, 2004.

The above-described image scanning apparatus including a diffraction grating type spatial light modulator classifies incident light into a negative mode and a positive mode based on a mode of $0^{th}$-order and uses the modes except the mode of $0^{th}$-order. That is, a clear image can be realized by using the diffraction grating type spatial light modulator.

However, image scanning apparatuses are large and requires more power consumption, thus not an ideal for used as a portable device. In particular, a system configuration is complicated and bulkier to limit the mode of $0^{th}$-order as a separate configuration must be further included, as described in U.S. Pat. No. 6,724,515

SUMMARY OF THE INVENTION

An object of the present invention is to substantially solve at least the above problems and/or disadvantages and to provide additional advantages, by providing an image scanning apparatus that can be portable because of its compact size and less power consumption.

According to one aspect of the present invention, there is provided an image scanning apparatus comprising: a spatial light modulator module for diffracting light beams having different wavelengths into relevant modes; and an iris for limiting light beams of modes except a mode of $0^{th}$-order among the modes diffracted by the spatial light modulator module.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Figure 1:
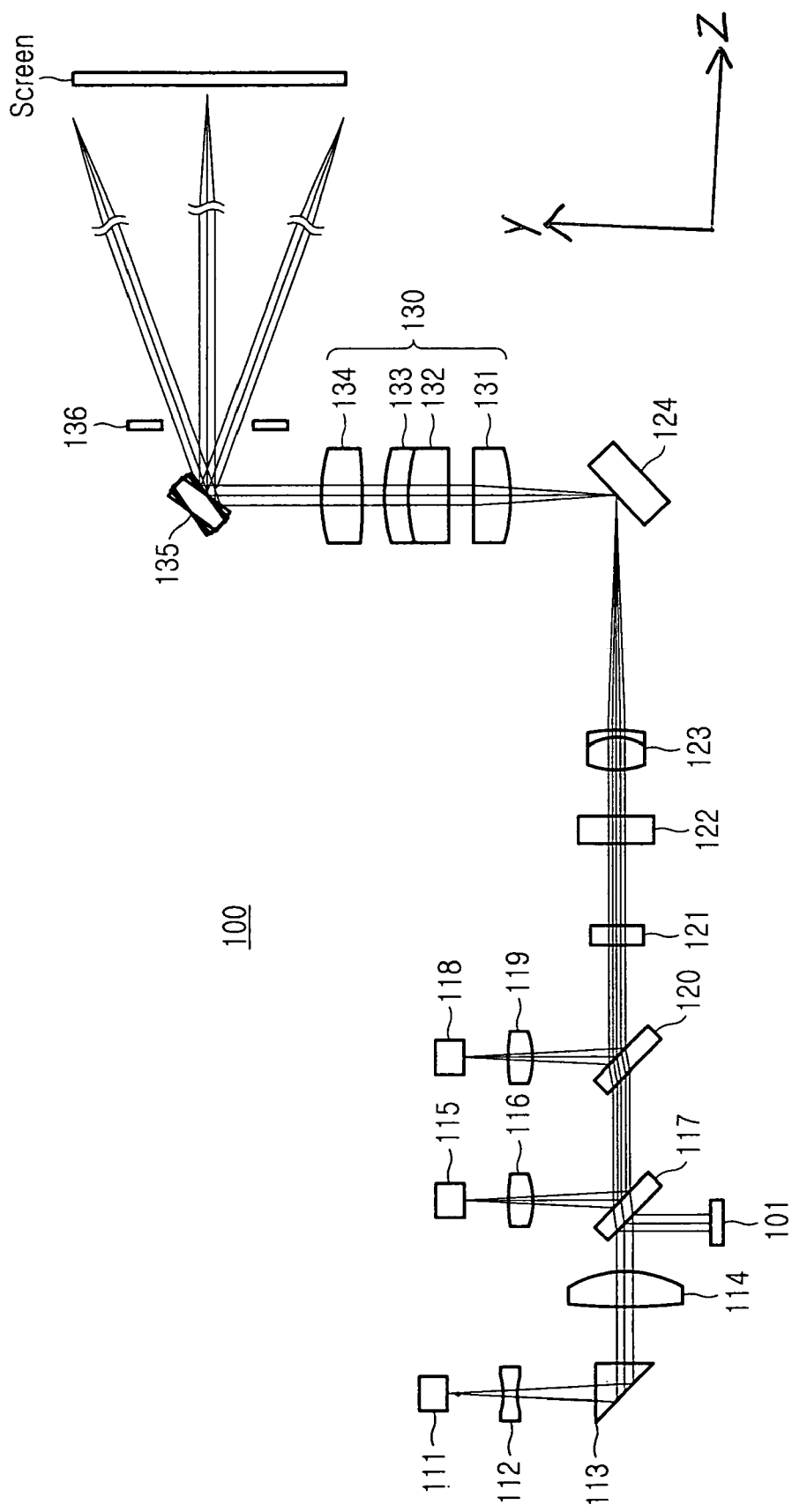
FIG. 1 is a configuration of an image scanning apparatus according to a first embodiment of the present invention.

Embodiments of the present invention will be described herein below with reference to the accompanying drawings. In the drawings, the same or similar elements are denoted by the same reference numerals even though they are depicted in different drawings. For the purposes of clarity and simplicity, well-known functions or constructions are not described in detail as they would obscure the invention in unnecessary detail.

Figure 2:
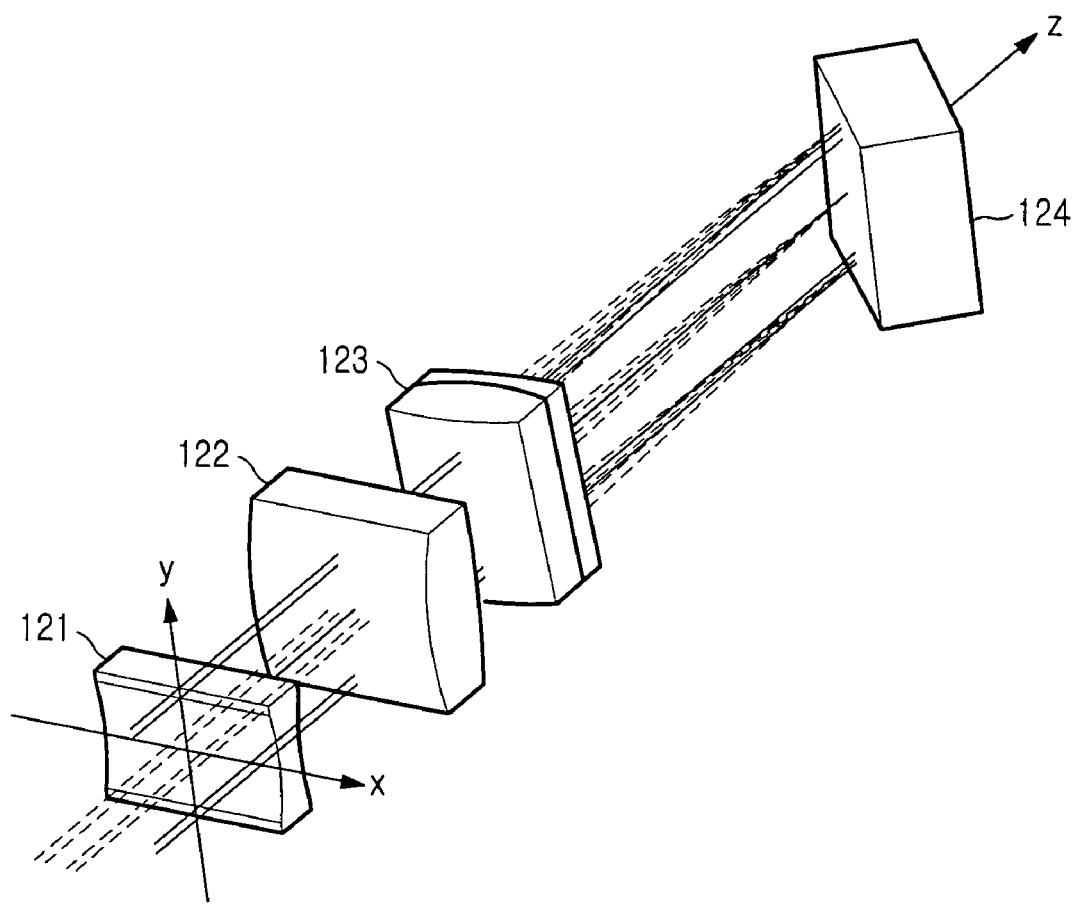
FIG. 2 is a perspective view of a portion of the configuration of FIG. 1.

FIG. 1 is a configuration of an image scanning apparatus 100 according to a first embodiment of the present invention. FIG. 2 is a perspective view of a portion of the configuration of FIG. 1.

Referring to FIG. 1, the image scanning apparatus 100 includes first to third light sources 111, 115, and 118 for generating light beams of different visible wavelength bands, collimation optics (114, 116, and 119) for collimating the light beams, line scan optics (121, 122, and 123) for forming a stripe pattern line scan perpendicular to the traveling direction of the collimated light beams, a spatial light modulator 124, image-forming optics 130, an iris 136, a scan mirror 135, and a screen. For the first to third light sources 111, 115, and 118, a semiconductor laser or second harmonic generator (SHG), which can generate the three primary colors, i.e., green, blue, and red, can be used.

The image scanning apparatus 100 can be used as a portable compact projector. To assist the understanding of the operation of the inventive apparatus, a three-axis coordinate system (x, y, and z) will be used. The z-axis can be defined as an optical axis coincident with the light traveling direction, the y-axis can be defined as an arbitrary axis perpendicular to the z-axis, and the x-axis can be defined as an axis perpendicular to both the z-axis and the y-axis. The line scan denotes a stripe pattern obtained while the major axis of light beams obtained by collimating the light beams with respect to the y-axis and converging the light beams with respect to the x-axis travels along the y-axis. The light beams are controlled to a line scan state to be easily input to the spatial light modulator 124.

The first light source 111 can use an SHG, and the second and third light sources 115 and 118 can include a semiconductor laser. The semiconductor lasers used for the second and third light sources 115 and 118 can generate red and blue light beams having the oval spot.

Figure 3A:
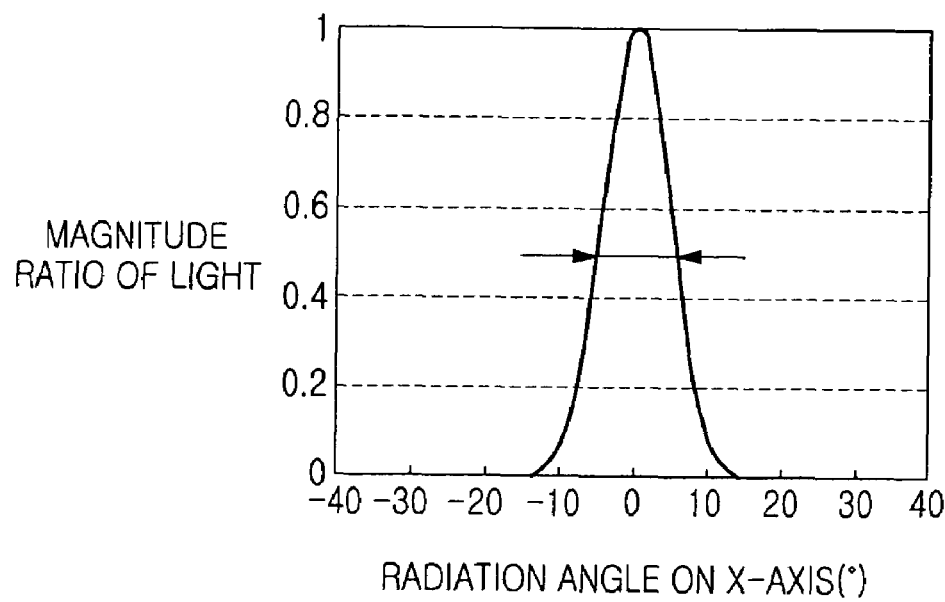
FIGS. 3A and 3B are graphs showing the magnitude of a spot of red light.
Figure 3B:
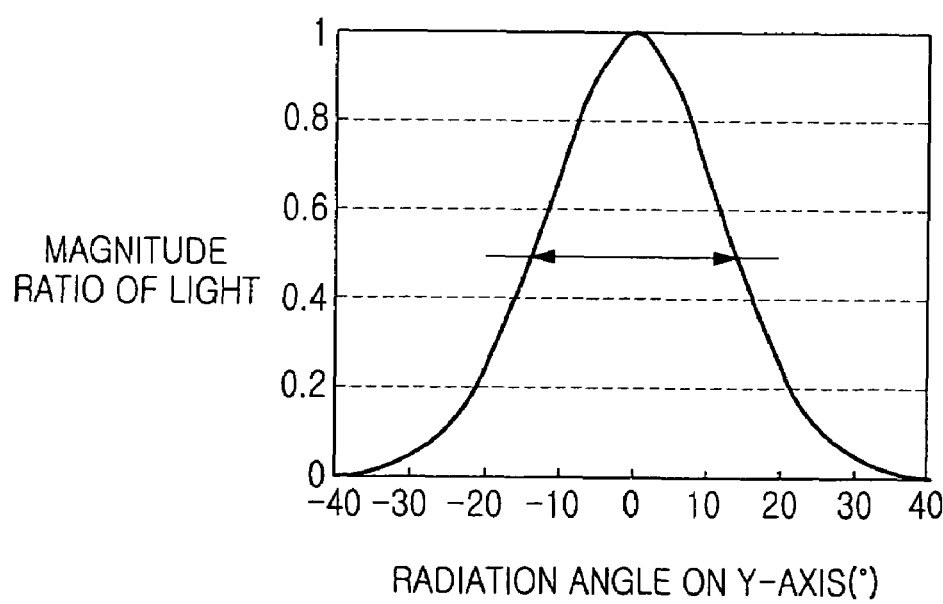
Figure 4A:
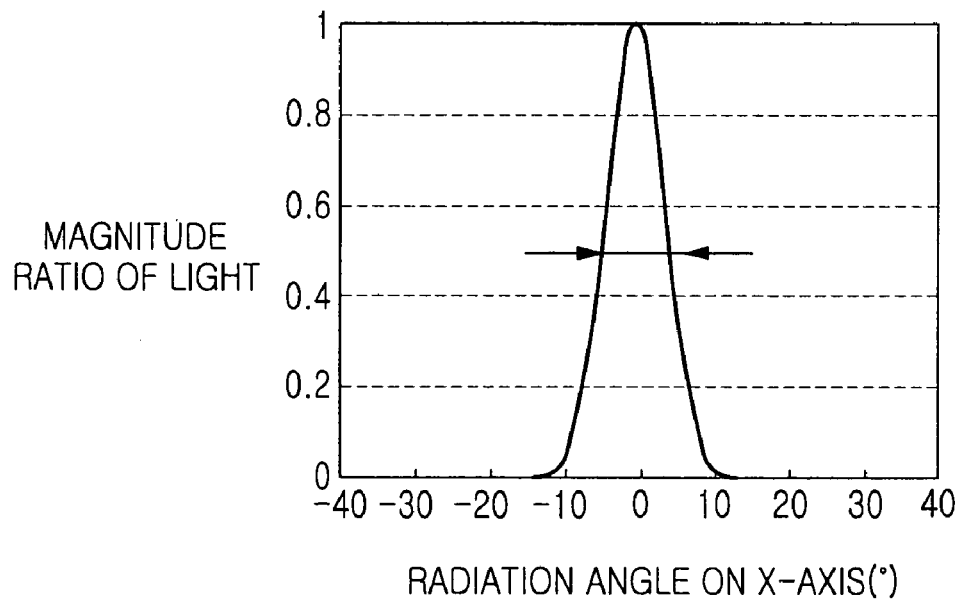
FIGS. 4A and 4B are graphs showing the magnitude of a spot of blue light.
Figure 4B:
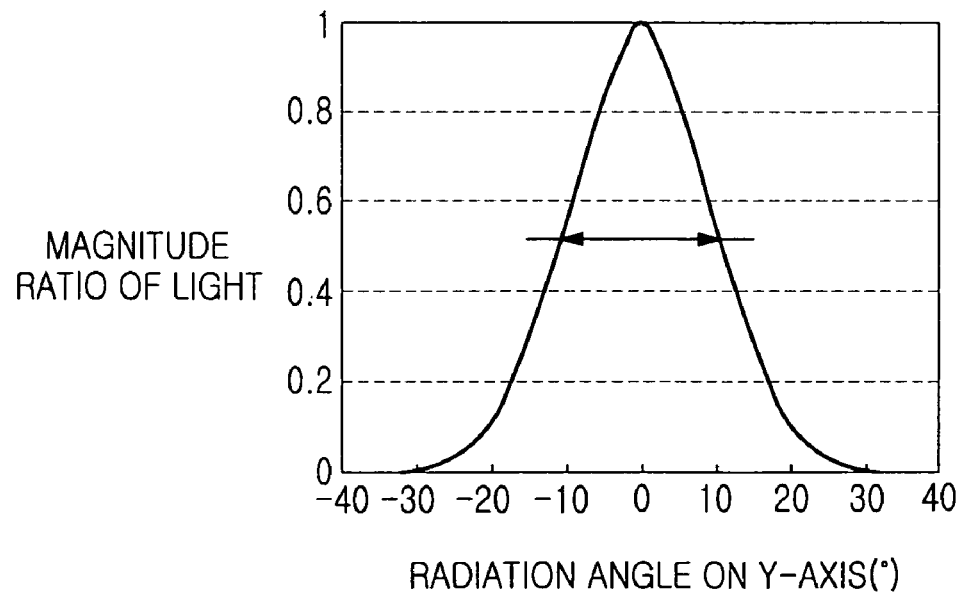

FIG. 3A shows a beam width on the minor axis of the red light, and FIG. 3B shows a beam width on the major axis of the red light. That is, the minor axis shown in the graph of FIG. 3A is located on the x-axis, and the major axis shown in the graph of FIG. 3B is located on the y-axis. FIG. 4A shows a beam width on the minor axis of the blue light, and FIG. 4B shows a beam width on the major axis of the blue light.

Referring to FIGS. 3A, 3B, 4A, and 4B, the second and third light sources 115 and 118 for generating the blue and red light beams are aligned so that the major axis of each of the blue and red light beams can be output in parallel to the y-axis. That is, for the generated blue and red light beams, the major axis travels in parallel to the y-axis, and the minor axis travels in parallel to the x-axis.

Figure 5A:
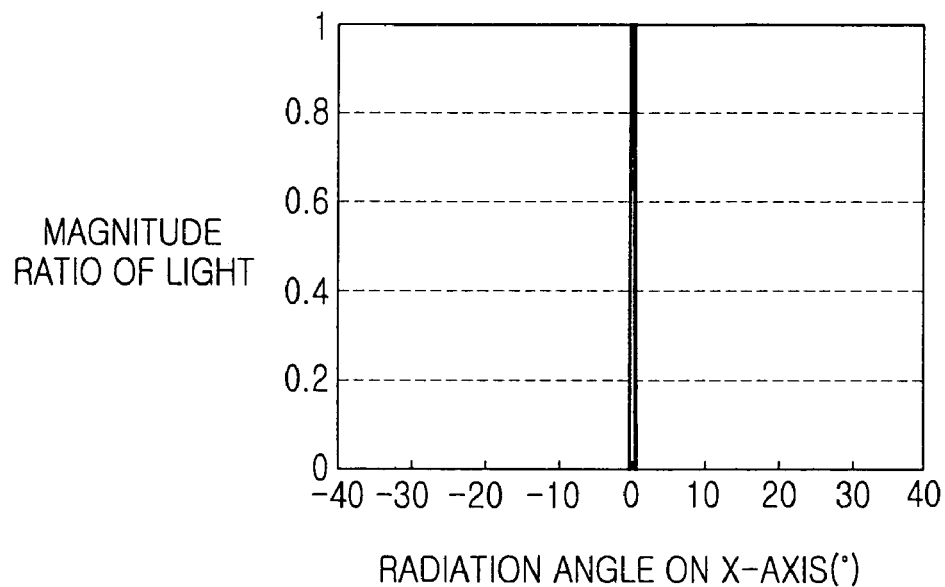
FIGS. 5A and 5B are graphs showing the magnitude of a spot of green light.
Figure 5B:
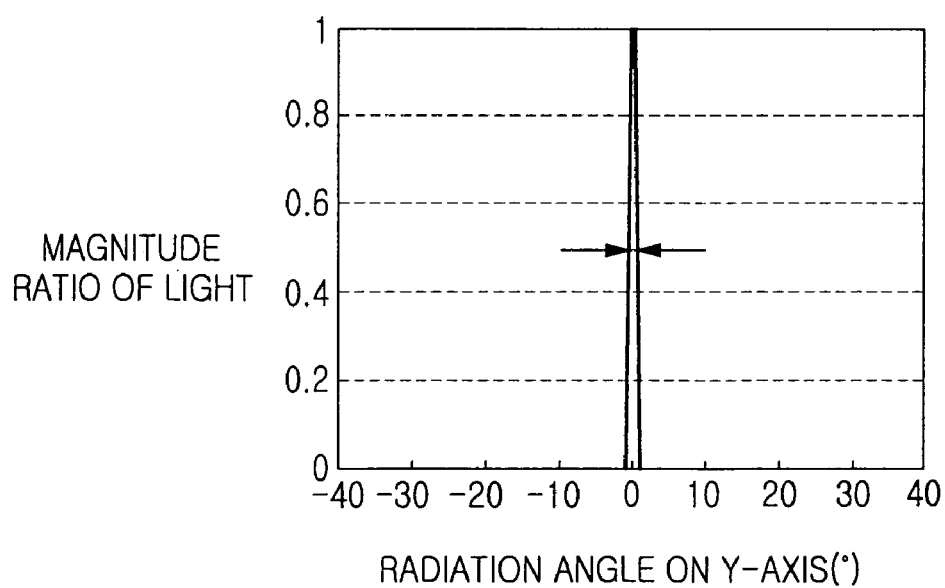

However, since it is difficult to generate the green light beam using the semiconductor laser, the green light beam can be generated using the SHG. FIG. 5A shows a beam width on the x-axis of the green light, and FIG. 5B shows a beam width on the y-axis of the green light. As shown in FIGS. 5A and 5B, the green light beam forms a circular spot having almost the same beam width on the x and y-axis.

The collimation optics are optics system for collimating the three primary colors generated by the first to third light sources 111, 115, and 118 and includes first to third lenses 114, 116, and 119 for respectively performing the collimation corresponding to the first to third light sources 111, 115, and 118, a reflective mirror 113, and first and second wavelength selection filters 117 and 120. The first to third light sources 111, 115, and 118 can be arranged in the order of green, red, and blue, the order of red, green, and blue, the order of red, blue, and green, the order of green, blue, and red, the order of blue, red, and green, or the order of blue, green, and red.

An optical detector 101 monitors the magnitude of the green light beam from a portion of the green light beam, which is reflected by the first wavelength selection filter 117.

The first lens 114 is located between the reflective mirror 113 and the first wavelength selection filter 117, collimates the green light beam reflected by the reflective mirror 113, and outputs the collimated green light beam to the first wavelength selection filter 117.

The reflective mirror 113 changes the traveling path of the green light beam generated by the first light source 111 to the vertical direction by reflecting the green light beam. The reflective mirror 113 can use a dielectric or metal vapor deposited thin-film filter.

The first wavelength selection filter 117 is located between the first lens 114 and the second wavelength selection filter 120, which are on the z-axis, and outputs the red light beam input from the second lens 116 and the green light beam reflected by the reflective mirror 113 to the line scan optics 121 to 123. The second wavelength selection filter 120 is located between the line scan optics 121 to 123 and the first wavelength selection filter 117, which are on the z-axis, reflects the blue light beam input from the third lens 119 to the line scan optics 121 to 123, and passes the green and red light beams to the line scan optics 121 to 123.

The line scan optics 121 to 123 includes a first diffusion lens 121, a y-axis collimation lens 122, and an x-axis convergence lens 123, converts the green, red, and blue light beams input from the second wavelength selection filter 120 into a line scan pattern, and outputs the line scan pattern to the spatial light modulator 124.

A diffraction grating type component, such as a SOM, a GLV, or a GEMS, can be used for the spatial light modulator 124, and the spatial light modulator 124 diffracts the input line scan pattern light beams to modes of $0^{th}$-order, $1^{st}$ order, and multi-orders in the direction of the image-forming optics 130.

The image-forming optics 130 can include a plurality of lenses 131 to 134, converges the modes diffracted by the spatial light modulator 124 into the scan mirror 135 in the side of the y-z plane, and outputs the modes diffracted by the spatial light modulator 124 to the scan mirror 135 in a collimated state.

The iris 136 limits the modes of diffraction orders except $0^{th}$-order among the light beams reflected by the scan mirror 135, and the scan mirror 135 converges the mode of $0^{th}$-order, which has passed through the iris 136, among the incident modes onto specific pixels on the screen. The green, red, and blue light beams are sequentially irradiated by turns, and an entire image can be formed by overlapping the green, red, and blue light beams on specific pixels by a line scan.

The image scanning apparatus 100 can further include a second diffusion lens 112 located between the first light source 111 and the reflective mirror 113.

Figure 6:
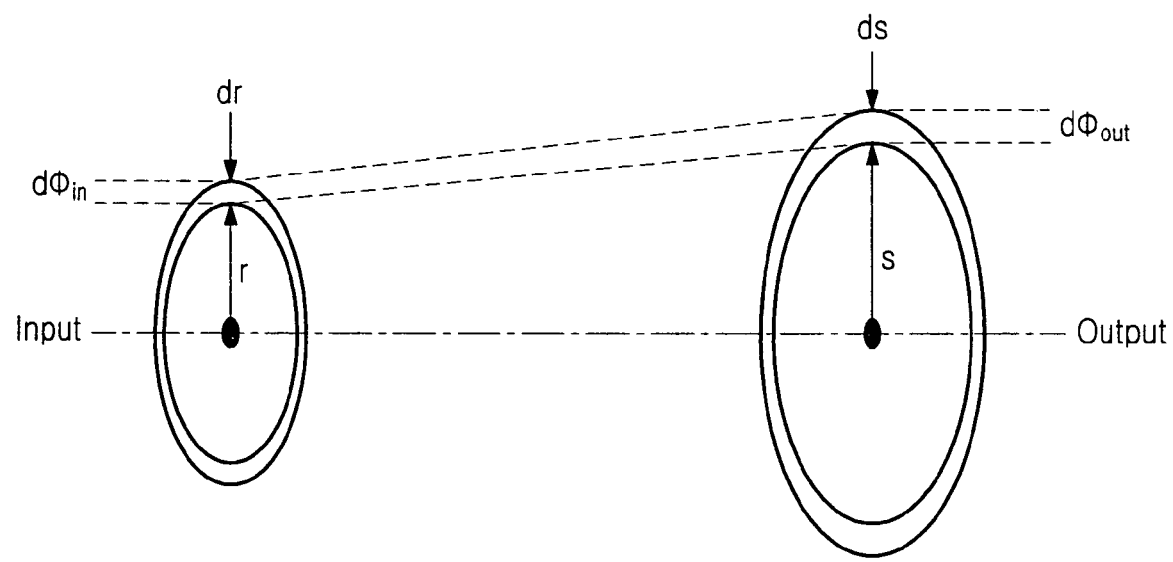
FIG. 6 is a diagram for explaining a correlative non-spherical surface.

FIG. 6 is a diagram for explaining a correlative non-spherical surface. As shown, the equations below can be deducted. Equation 1 indicates a correlation between a spot area of an input light beam and a spot area of an output light beam, and Equations 2 and 3 indicate the size and the magnitude of a spot transformed from the equivalent relationship of Equation 1.

$$d\phi_{in} = d\phi_{out} \tag{1}$$

$$I_{in}dArea_{in} = I_{out}dArea_{out} \tag{2}$$

$$I_{in}2\pi rdr = I_{out}2\pi sds \tag{3}$$

In Equations 2 and 3, $I_{in}$ denotes the magnitude of an input spot, $I_{out}$ denotes the magnitude of an output spot, $dArea_{in}$ denotes the size of the input spot, $dArea_{out}$ denotes the size of the output spot, $2\pi rdr$ denotes the size of the input spot according to a radius thereof, and $2\pi sds$ denotes the size of the output spot according to a radius thereof.

Equation 3 can be transformed into an exponential function, i.e., Equation 4, and a function of the radius s of the output spot, i.e., Equation 5, can be obtained from Equation 4.

$$I_o \exp(-kr^2) 2rdr = I_{out} 2sds \tag{4}$$

$$s = \sqrt{I_o \frac{[1 - \exp(-kr^2)]}{[kI_{out}]}} \tag{5}$$

Equation 5 can define a correlative non-spherical surface characteristic for increasing a light distribution uniformity ratio of a spot in the direction of the major axis. That is, by applying Equation 5 to the line scan optics 121 to 123 according to the current embodiment, a light distribution uniformity ratio of the light beams, which are output from the spatial light modulator 124, on the y-axis can be increased.

Figure 7:
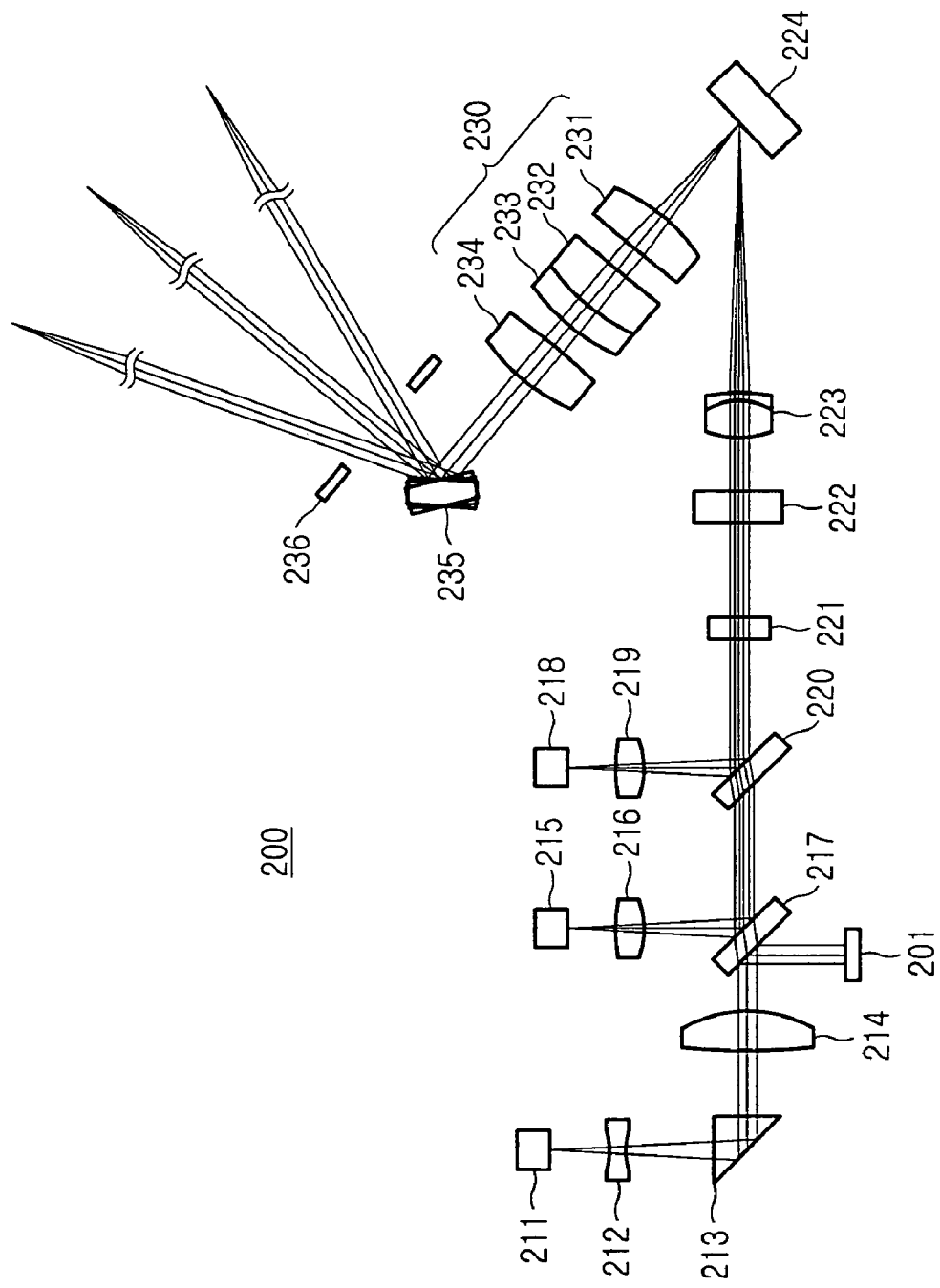
FIG. 7 is a configuration of an image scanning apparatus according to a second embodiment of the present invention.

FIG. 7 is a configuration of an image scanning apparatus 200 according to a second embodiment of the present invention. As shown, the image scanning apparatus 200 includes first to third light sources 211, 215, and 218 for generating light beams of different visible wavelength bands, collimation optics (214, 216, and 219) for collimating the light beams, line scan optics (221, 222, and 223) for forming a stripe pattern line scan perpendicular to the traveling direction of the collimated light beams, a spatial light modulator 224, an image-forming optics 230, an iris 236, a scan mirror 235, a screen, a reflective mirror 213, first and second wavelength selection filters 217 and 220, an optical detector 201 for monitoring the magnitude of a green light beam from a portion of the green light beam, which is reflected by the first wavelength selection filter 217, and a second diffusion lens 212.

The line scan optics includes a first diffusion lens 221, a collimation lens 222, and a convergence lens 223.

The spatial light modulator 224 reflects the path of incident light beams by making a sharp bend. The image-forming optics 230 includes a plurality of lenses 231, 232, 233, and 234 disposed on the path of the modes reflected by the spatial light modulator 224.

Figure 8:
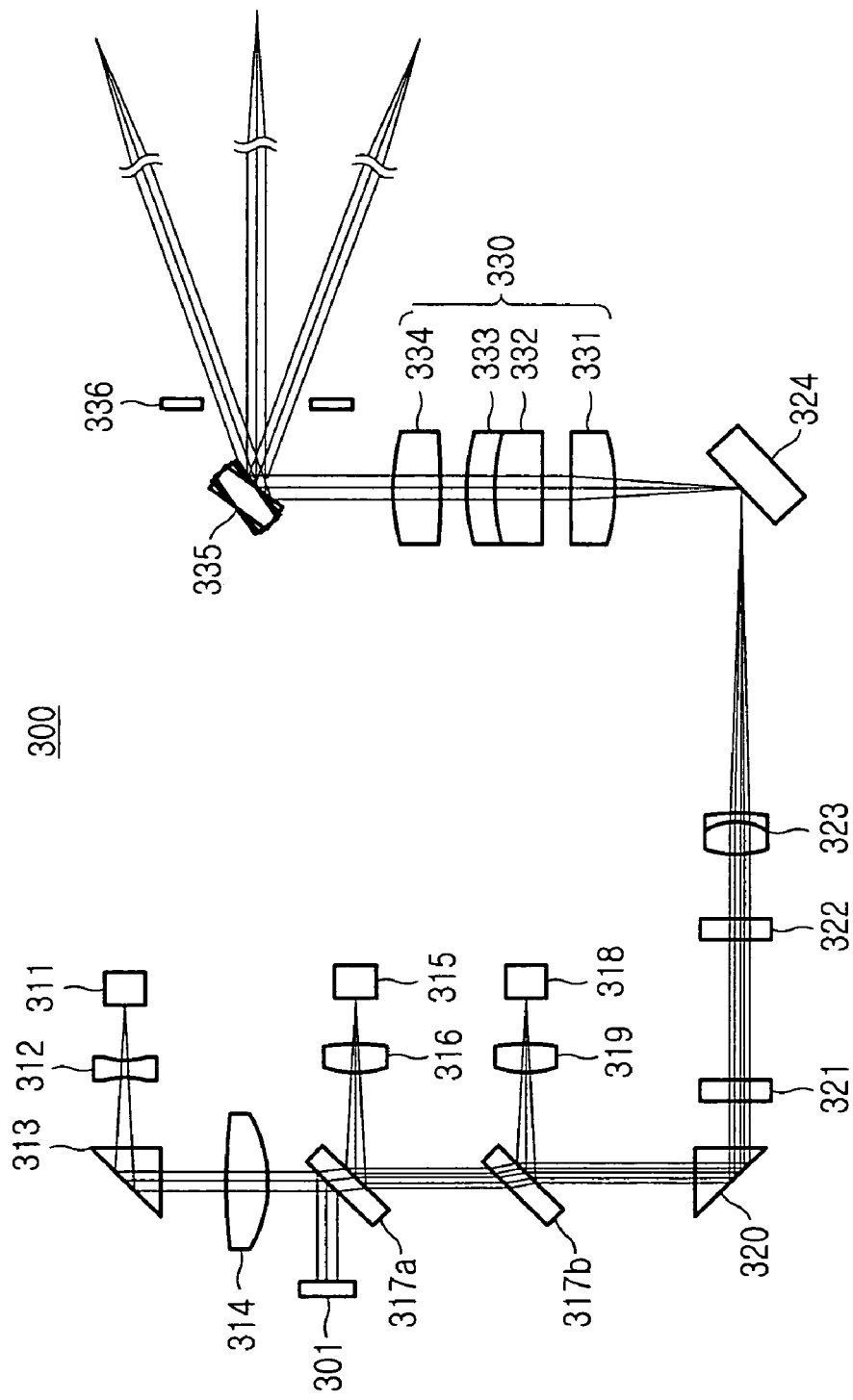
FIG. 8 is a configuration of an image scanning apparatus according to a third embodiment of the present invention.

FIG. 8 is a configuration of an image scanning apparatus 300 according to a third embodiment of the present invention. As shown, the image scanning apparatus 300 includes first to third light sources 311, 315, and 318 for generating light beams of different visible wavelength bands, collimation optics (312, 316, and 319) for collimating the light beams, line scan optics (321, 322, and 323) for forming a stripe pattern line scan perpendicular to the traveling direction of the collimated light beams, a spatial light modulator 324, an image-forming optics 330, composed of elements 331-334, an iris 336, a scan mirror 335, a screen, first and second reflective mirrors 313 and 320 for perpendicularly changing the path of the light beams, first and second wavelength selection filters 317a and 317b, an optical detector 301 for monitoring the magnitude of a green light beam from a portion of the green light beam, which is reflected by the first wavelength selection filter 317, and a second diffusion lens 312.

The line scan optics includes a first diffusion lens 321, a collimation lens 322, and a convergence lens 323.

As described above, according to the embodiments of the present invention, by realizing an image using only a mode of $0^{th}$-order among modes diffracted by a spatial light modulator module, a configuration of an iris for using only the mode of $0^{th}$-order can be simplified, thereby miniaturizing the entire system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An image scanning apparatus comprising:
   a spatial light modulator for diffracting light beams having different wavelengths into relevant modes;
   an iris for limiting the light beams of modes except a mode of $0^{th}$-order among the modes diffracted by the spatial light modulator module;
   a plurality of light sources for generating light beams of different visible wavelengths;
   a first lens for collimating a green light beam generated by one of said plurality of light sources;
   second and third lenses for collimating red and blue light beams generated by respective ones of the plurality of light sources;
   a first wavelength selection filter for passing the green light beam input from the first lens and perpendicularly reflecting the red light beam input from the second lens;
   a second wavelength selection filter for passing the green and red light beams input from the first wavelength selection filter and perpendicularly reflecting the blue light beam input from the third lens;
   a first diffusion lens for diffusing the green, red, and blue light beams input from the second wavelength selection filter;
   collimation and convergence lenses, which are disposed between the first diffusion lens and the spatial light modulator, forms a stripe pattern of the green, red, and blue light beams, which are input from the first diffusion lens, in a direction perpendicular to the light beam traveling direction, and outputs the stripe pattern to the spatial light modulator, and
   a scan minor for reflecting the light beams input from the spatial light modulator into a direction of the iris.

2. The image scanning apparatus of claim 1, further comprising:
   an image-forming optics, disposed between the scan mirror and the spatial light modulator module, for projecting the modes into the scan mirror.

3. The image scanning apparatus of claim 1, wherein a first light source of said plurality of light sources comprises a second harmonic generator for generating the green light beam.

4. The image scanning apparatus of claim 1, wherein a second light source of said plurality of light sources comprise:
   a semiconductor laser for generating the red light beam having an oval shaped spot, wherein a major axis of the red light spot matches a major axis of the stripe shaped light formed by the collimation and convergence lenses.

5. The image scanning apparatus of claim 1, wherein a third light source of said plurality of light sources comprises:
   a semiconductor laser for generating the blue light beam having an oval shaped spot, wherein a major axis of the blue light spot matches a major axis of the stripe shaped light formed by the collimation and convergence lenses.

6. The image scanning apparatus of claim 1, wherein the image-forming optics comprises at least one lens.

7. The image scanning apparatus of claim 1, wherein a correlation non-spherical surface according to the equation below is applied to each surface of the second diffusion lens, the collimation lens, and the convergence lens:

$$s = \sqrt{I_o \frac{[1 - \exp(-kr^2)]}{[kI_{out}]}},$$

where s denotes a radius of an output spot, $I_0$ denotes the magnitude of output light, and r denotes a radius of an input spot.

8. The image scanning apparatus of claim 1, further comprising;
   an optical detector for monitoring the magnitude of the green light beam from a portion of the green light beam, which is reflected by the first wavelength selection filter.

9. The image scanning apparatus of claim 1, further comprising:

a second diffusion lens disposed between the first light source and the reflective mirror.

10. The image scanning apparatus of claim 1, further comprising:
a reflective mirror, disposed between the second wavelength selection filter and the first diffusion lens and inputs the light beams, which arc input from the second wavelength selection filter, to the first diffusion lens by reflecting the input light beams in the perpendicular direction of a traveling path of the input light beams.

* * * * *